US011956871B2

(12) United States Patent
Yang et al.

(10) Patent No.: US 11,956,871 B2
(45) Date of Patent: Apr. 9, 2024

(54) COLORED LIGHT APPARATUS BASED ON SIGNAL EDGES FROM POWER SUPPLY LINE

(71) Applicant: HANGZHOU YUN LED CHIP PHOTOELECTRICITY TECH. CO., LTD., Hangzhou (CN)

(72) Inventors: Yinghan Yang, Hangzhou (CN); Zixun Zhang, Hangzhou (CN)

(73) Assignee: HANGZHOU YUN LED CHIP PHOTOELECTRICITY TECH. CO., LTD., Hangzhou (CN)

( * ) Notice: Subject to any disclaimer, the term of this patent is extended or adjusted under 35 U.S.C. 154(b) by 141 days.

(21) Appl. No.: 17/660,206

(22) Filed: Apr. 21, 2022

(65) Prior Publication Data

US 2022/0248518 A1 Aug. 4, 2022

Related U.S. Application Data

(63) Continuation of application No. PCT/CN2020/082056, filed on Mar. 30, 2020.

(30) Foreign Application Priority Data

Nov. 1, 2019 (CN) ......................... 201911059893.6

(51) Int. Cl.
*H05B 45/46* (2020.01)
*H05B 45/20* (2020.01)
*H05B 47/185* (2020.01)

(52) U.S. Cl.
CPC ............. *H05B 45/46* (2020.01); *H05B 45/20* (2020.01); *H05B 47/185* (2020.01)

(58) Field of Classification Search
None
See application file for complete search history.

(56) References Cited

U.S. PATENT DOCUMENTS

2017/0027030 A1* 1/2017 Wang ..................... H05B 45/20

FOREIGN PATENT DOCUMENTS

CN 105722270 A 6/2016
CN 110730536 A 1/2020

OTHER PUBLICATIONS

International Search Report in Application No. PCT/CN2020/082056, dated Jul. 30, 2020.

(Continued)

*Primary Examiner* — Renan Luque
(74) *Attorney, Agent, or Firm* — Syncoda LLC; Feng Ma

(57) ABSTRACT

A colored light apparatus controlled by input edge signals from a power supply line includes a signal edge generator configured to generate signal edges and output the signal edges to a power supply line; a plurality of LED modules each including an LED group, and an LED driver to drive the LED group based on the signal edges from the power supply line. The LED modules are electrically connected between a common anode and a common cathode. The controllable switch module is turned between ON and OFF controlled by the control circuit of said signal edge generator. Signal edges are generated when the controllable switch module turns from ON to OFF, or the controllable switch module turns from OFF to ON.

18 Claims, 3 Drawing Sheets

(56) References Cited

OTHER PUBLICATIONS

Written Opinion of the International Searching Authority dated Jul. 30, 2020.
CN first Office Action in Application No. 201911077707.1, dated Jan. 6, 2021.
Notification of Transmittal of the International Search Report and the Written Opinion of the International Searching Authority, or the Declaration in Application No. PCT/CN2020/082056, dated Jul. 30, 2020.

* cited by examiner

COLORED LIGHT APPARATUS BASED ON SIGNAL EDGES FROM POWER SUPPLY LINE

CROSS-REFERENCE TO RELATED APPLICATIONS

The present application is a continuation of, and claims priority to, PCT Application No. PCT/CN2020/082056 filed on Mar. 30, 2020, which in turn claims priority to Chinese Patent Application No. CN 201911059893.6 filed on Nov. 1, 2019. The disclosures of the above-referenced applications are hereby incorporated by reference in their entirety.

BACKGROUND

LED lights can be in a steady mode, or a flicker mode. LEDs in a steady mode are easier to manufacture, but with monotonous decoration effects. Those methods to manufacture LED lighting strings in flicker mode include: LED flashbulbs are installed among steady mode LEDs with fixed mode and without any change modes controlled by signals; LED lights are divided into several groups controlled by the controller for each group. To make the LED lighting strings work like water flowing, it must be adapted for over 3-channels structure, and the more channels the better the effect of lighting.

SUMMARY

To solve the problems in current technologies mentioned above, some embodiments disclosed herein provide a colored light apparatus based on signal edges from a power supply line.

A colored light apparatus based on signal edges from power supply line comprises: a signal edge generator configured to generate signal edges and output the signal edges to a power supply line; a plurality of LED modules, where each LED module comprises an LED group and an LED driver to drive said LED group based on the signal edges from the power supply line.

Said LED modules are electrically connected between a common anode and a common cathode.

Said signal edge generator comprises a controllable switch module and a control circuit.

In some embodiments, said controllable switch module comprises a control port, an input port and an output port.

The control port of said controllable switch module is electrically connected to said control circuit, the input port of said controllable switch module is electrically connected to said common cathode, and the output port of said controllable switch module is electrically connected to the ground.

Said common anode is electrically connected to a current source.

In some embodiments, the control port of said controllable switch module is connected to said control circuit via a resistance to limit current.

In order to set the lowest potential at a same level for said control circuit and said controllable switch module, said control circuit and the output port of said controllable switch module are connected with said ground.

In some embodiments, said LED modules are connected in parallel. The anodes of said LED modules are connected to said common anode, and the cathodes of said LED modules are connected to said common cathode.

In some embodiments, said LED modules are grouped into a plurality of parallel modules. Said parallel modules are connected in series. All anodes of LED modules in a parallel module are electrically connected as the anode of parallel module, and all cathodes of LED modules in the parallel module are electrically connected as the cathode of the parallel module. The anode of the first parallel module is said common anode; the cathode of the first parallel module electrically connects to the anode of the second parallel module; the cathode of the second parallel module electrically connects the anode of the third parallel module; in this way, each parallel module is electrically connected. The cathode of the last parallel module is said common cathode.

In some embodiments, said LED modules are grouped into a plurality of series modules. Said series modules are connected in parallel. The anode of a series module is the anode of the first LED module in the series module; the cathode of the first LED module electrically connects to the anode of the second LED module in the series module; the cathode of the second LED module electrically connects to the anode of the third LED module in the series module; in this way, each LED module is electrically connected in the series module; the cathode of the last LED module is the cathode of the series module. A plurality of series modules is electrically connected; all the anode of series modules are electrically connected as said common anode; all the cathode of series modules are electrically connected as said common cathode.

Said controllable switch module is turned between ON and OFF controlled by the control circuit of said signal edge generator. Signal edges are generated when said controllable switch module turns from ON to OFF, or said controllable switch module turns from OFF to ON.

A rising signal edge is generated for LED modules when said controllable switch module is turned from OFF to ON. Said common anode and said common cathode are from equal potential to unequal potential when said controllable switch module is turned from OFF to ON.

A falling signal edge is generated for LED modules when said controllable switch module is turned from ON to OFF. Said common anode and said common cathode are from unequal potential to equal potential when said controllable switch module is turned from ON to OFF.

In some embodiments, the time interval is larger than 10 ns and smaller than 10 ms when said controllable switch module is turn OFF for signal edge generation.

Said signal edges are used as control signals for said LED driver. Said LED driver is triggered to perform computation by signal edges. Said LED group are drive based on the computation results of said LED driver.

In some embodiments, said signal edges are used as clock signals for said LED driver. Said LED driver is triggered to perform computation by said clock signals. Said LED group are drive based on the computation results of said LED driver.

Said LED group comprises n LEDs, and the connection type of the LED group is one of A(n, n) permutations connection types corresponding to the n output ports of the LED driver. The anodes of n LEDs connect to the power input port of the LED module, and the cathodes of n different color LEDs connect to n output port of the LED driver respectively.

In some embodiments, said LED driver is same as the LED driver in the Chinese invention patent “a computation apparatus and a LED driver triggered by signal edges from power supply line” (Patent No. ZL 2014 1 0632645.7).

In some embodiments, said control circuit is implement based on Microprocessor Control Unit (MCU). To further reduce cost, in some embodiments, a single chip microcomputer (SCM) is selected as the MCU.

In some embodiments, a N channel MOSFET is used as said controllable switch module. The gate of said N channel MOSFET is used as the control port of said controllable switch module; the drain of said N channel MOSFET is used as the input port of said controllable switch module; the source of said N channel MOSFET is used as the output port of said controllable switch module.

In some embodiments, said controllable switch module comprises an auxiliary control port, said controllable switch module comprises: a first controllable switch, a second controllable switch and a current limiting resistance; said first controllable switch comprises first control port, first input port, and first output port; said first control port electrically connects to said auxiliary port of said controllable module; said first control port electrically connects to said control circuit, said first input port electrically connects to the input port of said controllable module, and said first output port electrically connects to ground; said second controllable switch comprises second control port, second input port, and second output port; said second control port electrically connects to said control port of said controllable switch module; said second control port electrically connects to said control circuit; said second output port electrically connects to ground; one port of said current limiting resistance connects to the input port of said controllable switch module, the other port of said current limiting resistance connects to said second input port. In some embodiments, said current limiting resistance connects is a nonlinear resistor, such as a diode, or a Zener Diode.

In some embodiments, said first control port connects to said control circuit via a resistance; said second control port connects to said control circuit via a resistance.

In some embodiments, signal edges are generated as following step: at first step, said first controllable switch is turned OFF; at second step, said second controllable switch is turned from ON to OFF to generate a falling signal edge; at third step, said second controllable switch is turned from OFF to ON to generate a rising signal edge; repeat the second step and the third step to generate a plurality of falling signal edges and a plurality of rising signal edges; at final step, said first controllable switch is turned ON.

In some embodiments, said second controllable switch is kept being ON when said first controllable switch is turned between ON and OFF to generate signal edges. A rising signal edge is generated when said first controllable switch is turned from OFF to ON; a falling signal edge is generated when said first controllable switch is turned from ON to OFF. When said first controllable switch is turned OFF, current is flowing from said LED modules, said current limiting resistance and said second controllable switch to ground. In normal working mode, said second controllable switch is kept being ON for an alternative current path when said first controllable switch is turned OFF. In POWER OFF mode or low power mode, said second controllable switch is turned OFF to block current through said current limiting resistance.

When the potential of anode is larger than the potential of cathode, there exists current from anode to cathode to drive LED lighting, such as said common anode and said common cathode, said anode of LED module and said cathode of LED module, said anode of series module and said cathode of series module, said anode of parallel module and said cathode of parallel module.

According to some embodiments, power is supplied from the power supply line, and clock signals for the LED drivers are transferred from the power supply line. The clock signals are the signal edges from the power supply line, also are the power edge signals according to some embodiments of the present disclosure. It is not necessary to use clock generation circuits in the LED drivers.

Said signal edge generator can be named as edge signal generator; said signal edges can be named as edge signals.

Compared with the current technologies, signal edges are carried from the power supply line by the controllable switch module switching between ON and OFF in the colored light. Those led groups are drive to get many different color patterns with each led module and its drivers connected to the power supply line. This makes the circuit of LED drivers simple and reduces cost. Moreover, various effects of decorations can be achieved by MCU programming.

BRIEF DESCRIPTION OF DRAWINGS

To more clearly illustrate the embodiments of the disclosure, the following is a brief description of the drawings, which are for illustrative purpose only. For those of ordinary skills in the art, other drawings of other embodiments can become apparent based on these drawings.

DETAILED DESCRIPTION

In the following, with reference to the drawings of embodiments disclosed herein, the technical solutions of the embodiments of the disclosure will be described in a clear and fully understandable way. All the disclosures of the references are incorporated by reference in their entirety.

The mode to divide an LED lighting string into several LED groups needs to connect those LEDs which lighting at same time in series, and then to connect each group in parallel. The more channels of the LED colored light are used with more complex structure, more electric wire, more manufacturing difficulty, and higher cost, also with larger size, various parts, and high cost of products.

In the market, there exist a type of computing apparatus and an LED driver triggered by signal edges from a power supply line. Those are disclosed in the Chinese patent "A kind of computation apparatus trigged by signal edges from a power supply line and an LED driver" (Patent No. ZL201410632645.7), and the Chinese patent "A colorful light apparatus based on signal edges from a power supply line" (Patent No. ZL201410775449.5). Those LED drivers are used in mass for higher performance.

In the Chinese patent (Patent No. ZL201410775449.5), the control port of a controllable switch connects to a control circuit, the input port of the controllable switch connects to a current source, and the output port of the controllable switch connects to the power supply line. But the control circuit connected to the controllable switch is more complex, and the cost is highly in the Chinese patent (Patent No. ZL201410775449.5).

First Embodiment

Figure 1:
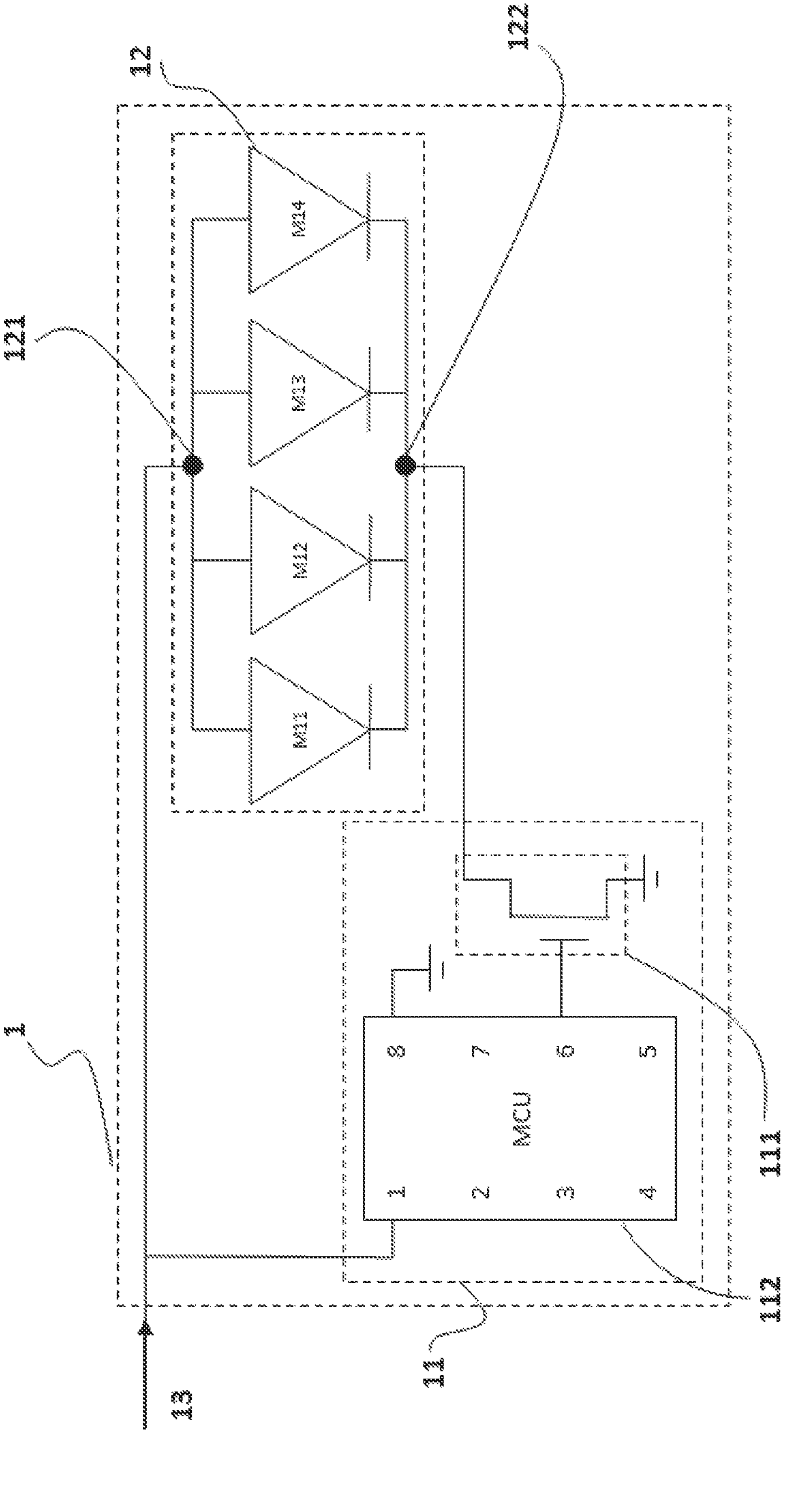
FIG. 1 illustrates a schematic diagram of a colored light apparatus based on signal edges from power supply line of first embodiment.

As illustrated in FIG. 1, an implemented colored light apparatus 1 based on signal edges from power supply line comprises: an edge signal generator 11 configured to generate signal edges and output signal edges to the power supply line; four LED modules 12 are connected in parallel which are M11, M12, M13 and M14. All anodes of the four LED modules 12 are connected as common anode 121 of LED modules, all cathodes of the four LED modules 12 are connected as common cathode 122 of LED modules.

The colored light apparatus 1 in the embodiment uses a 5 V current source 13 as input.

The signal edge generator 11 in the embodiment, comprises control circuit 112 and a controllable switch module. The control circuit comprises an MCU. The port No. 1 is the power supply port for MCU which connected to a 5 V current source 2; the port No. 8 is the ground port for MCU which connected to ground. The controllable switch module is a N channel MOSFET 111, the gate of the N channel MOSFET is the control port of the controllable switch module, the drain of the N channel MOSFET is the input port of the controllable switch module, the source of the N channel MOSFET is the output port of the controllable switch module. The gate of the N channel MOSFET connects to the No. 6 port of the MCU, the drain of the N channel MOSFET connects to said common cathode of LED modules 122, the source of the N channel MOSFET connects to ground.

Figure 2:
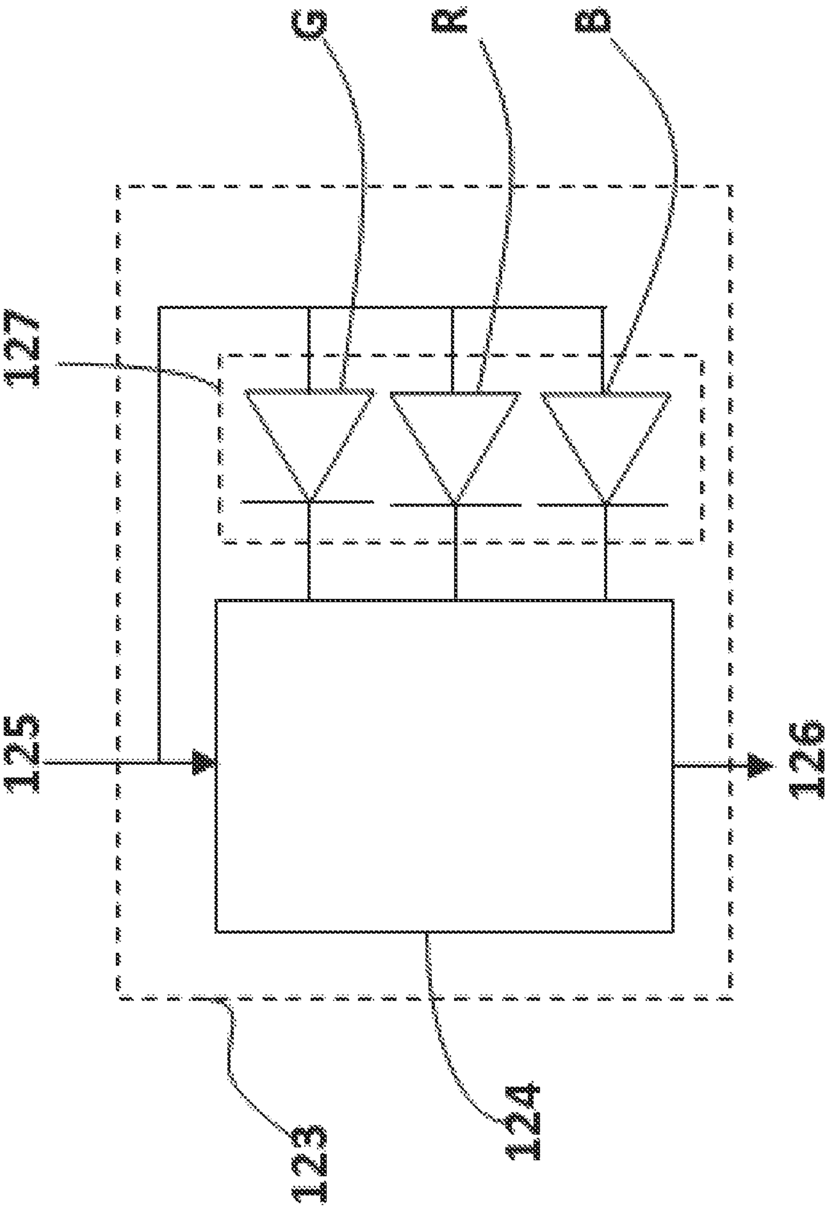
FIG. 2 illustrates an implemented connection diagram of an LED module between LED group and LED driver according to some embodiments of first embodiment.

As illustrated in FIG. 2, an LED module 123 comprises an LED group 127 and an LED driver 124 triggered by the signal edges from a power supply lines to drive the LED group 127. In the embodiment, the LED group 127 comprises three LED which are a red LED R, a green LED G and a blue LED B respectively. One port of LED module is the anode of LED module 125, the other port of LED module is the cathode of LED module 126.

The LED driver 124 comprises: an edge-triggered computing unit configured to be triggered to perform computing by the signal edges from the power supply line, and configured to output computing results; a charging unit configured to supply power to the edge-triggered computing unit based on the signal edges from the power supply line, where the charging unit is charged when the edge signal from the power supply line is at a high voltage, and the charging unit is discharged when the edge signal from the power supply line is at a low voltage; an initialization unit configured to initialize the edge-triggered computing unit based on the voltage of the power supplied by the charging unit.

The edge-triggered computing unit comprises n D flip-flops connected in parallel and one k-bit arithmetic and logic unit, n and k are integers, and n equals k in value, and the computational results are output via the outputs of the n D flip-flops, among which: the D inputs of the n D flip-flops are connected to the outputs of the arithmetic and logic unit, one to one and bit to bit, low bit to low bit and high bit to high bit; the reset inputs of the n D flip-flops are connected to the initialization unit, and the clock inputs are connected to the power supply line; the group A inputs of the arithmetic and logic unit are connected to the Q outputs of the n D flip-flops, bit to bit, low bit to low bit and high bit to high bit, and the group B inputs are configured to receive an external pattern control parameter.

The arithmetic and logic unit is the logic circuit to perform arithmetic or logic operations. The two operands of the arithmetic and logic unit are from the group A inputs and the group B inputs. The output of the arithmetic and logic unit is the result of arithmetic or logic computing of the operands from the group A inputs and the group B inputs.

The N channel MOSFET 111 is turned ON when the No. 6 port of MCU at a high voltage. The potential at the anode of LED modules is unequal to the potential at the cathode of LED modules when the N channel MOSFET 111 is ON.

The N channel MOSFET 111 is turned OFF when the No. 6 port of MCU at a low voltage. The potential at the anode of LED module is equal to the potential at cathode of LED module when the N channel MOSFET 111 is OFF.

The LED drivers of M11, M12, M13 and M14 receive a rising edge when the N channel MOSFET 111 is turned from OFF to ON with the voltage of No. 6 port of MCU from a low voltage to a high voltage. The LED drivers of M1, M2, M3 and M4 receive a falling edge when the N channel MOSFET 111 is turned from ON to OFF with the voltage of No. 6 port of MCU from a high voltage to a low voltage. The signal edges are generated when the N channel MOSFET 111 is turned between ON and OFF with the No. 6 port at different voltage. The LED driver 124 controls the red LED R, the green LED G and the blue LED B when the LED driver 124 performs computation triggered by signal edges.

Second Embodiment

Figure 3:
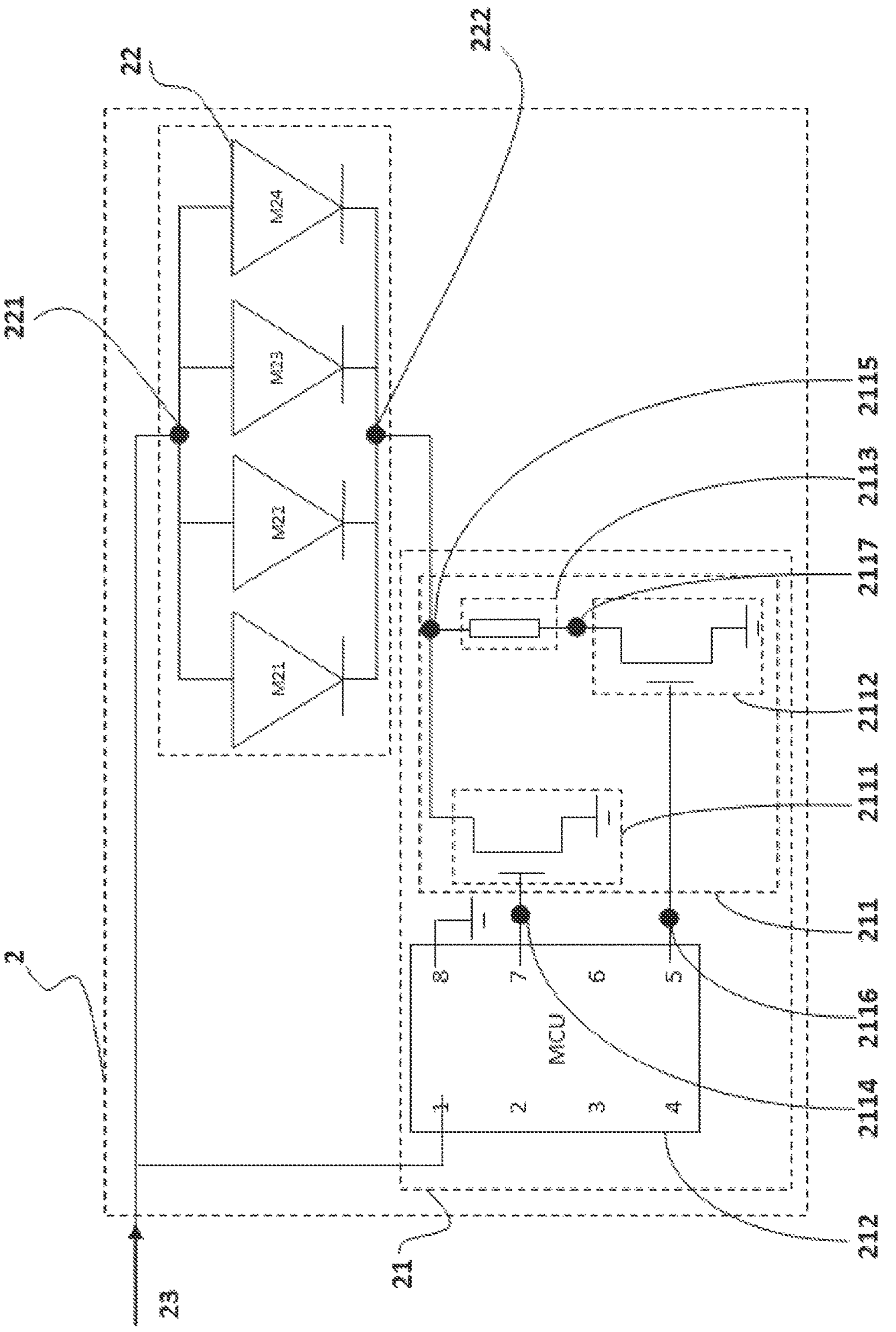
FIG. 3 illustrates a schematic diagram of a colored light apparatus based on signal edges from power supply line of second embodiment.

As illustrated in FIG. 3, an implemented colored light apparatus 2 based on signal edges from power supply line comprises: an edge signal generator 21 configured to generate signal edges and output signal edges to the power supply line; four LED modules 22 are connected in parallel which are M21, M22, M23 and M24. All anodes of the four LED modules 22 are connected as common anode 221 of LED modules, all cathodes of the four LED modules 22 are connected as common cathode 222 of LED modules.

The colored light apparatus 2 in the embodiment uses a 5 V current source 23 as input.

The signal edge generator 21 in the embodiment, comprises control circuit 212 and a controllable switch module 211. The control circuit comprises an MCU. The port No. 1 is the power supply port for MCU which connected to 5 V current source 23; the port No. 8 is the ground port for MCU which connected to ground. The controllable switch module 211 comprises: a first controllable switch 2111, a second controllable switch 2112 and a current limiting resistance 2113; first controllable switch 2111 comprises first control port, first input port, and first output port; first control port electrically connects to auxiliary port 2114 of controllable module 211; first input port electrically connects to the input port 2115 of controllable module 211, and first output port electrically connects to ground; second controllable switch 2112 comprises second control port, second input port, and second output port; second control port electrically connects to control port 2116 of controllable switch module 211; second output port electrically connects to ground; one port of said current limiting resistance 2113 connects to the input port 2115 of controllable switch module 211, the other port 2117 of said current limiting resistance connects to second input port of second controllable switch 2112. First controllable switch 2111 is a N channel MOSFET, the gate of the N channel MOSFET is first control port, the drain of the N channel MOSFET is first input port, the source of the N channel MOSFET is first output port. Second controllable switch 2112 is a N channel MOSFET, the gate of the N channel MOSFET is second control port, the drain of the N channel MOSFET is second input port, the source of the N channel MOSFET is second output port.

LED modules 22 is same as LED module 12 in first embodiment as illustrated in FIG. 2.

Signal edges are generated as following step: at first step, first controllable switch 2111 is turned OFF; at second step, second controllable switch 2112 is turned from ON to OFF to generate a falling signal edge; at third step, second controllable switch 2112 is turned from OFF to ON to generate a rising signal edge; repeat the second step and the third step to generate a plurality of falling signal edges and a plurality of rising signal edges; at final step, first controllable switch 2111 is turned ON.

Third Embodiment

The circuit schematic of third embodiment is same as second embodiment as illustrated in FIG. 3. Edge signal generation of third embodiment is different to the second embodiment.

LED modules 22 is same as LED module 12 in first embodiment as illustrated in FIG. 2.

In the third embodiment, second controllable switch 2112 is kept being ON when first controllable switch 2111 is turned between ON and OFF to generate signal edges. A rising signal edge is generated when first controllable switch 2111 is turned from OFF to ON; a falling signal edge is generated when first controllable switch 2111 is turned from ON to OFF. When first controllable switch 2111 is turned OFF, current is flowing from said LED modules 22, current limiting resistance 2113 and second controllable switch 2112 to ground. In normal working mode, second controllable switch 2112 is kept being ON for an alternative current path when first controllable switch 2111 is turned OFF. In POWER OFF mode or low power mode, second controllable switch 2112 is turned OFF to block current through current limiting resistance 2113.

In some implementations, a lighting system can be provided, including a current source, the power supply line, and a plurality of LED apparatuses with various colors as described above.

Various embodiments of the present disclosure can have one or more of the following advantages. The signal edges are carried from the power supply line by the controllable switch module switching between ON and OFF to control the power supply line ON and OFF in the colored light. Those led groups are drive to get many different color patterns with each led module and its drivers connected to the power supply line directly. This can the circuit simpler, and with reduced cost.

What is claimed is:

1. A colored light apparatus comprising:
- a signal edge generator configured to generate signal edges and output the signal edges to a power supply line; and
- a plurality of light-emitting diode (LED) modules, where each LED module comprises an LED group and an LED driver to drive the LED group based on the signal edges from the power supply line;

wherein:
- the plurality of LED modules are electrically connected between a common anode and a common cathode;
- the signal edge generator comprises a controllable switch module and a control circuit;
- the controllable switch module comprises a control port, an input port and an output port; and
- the control port of the controllable switch module is electrically connected to the control circuit, the input port of the controllable switch module is electrically connected to the common cathode, and the output port of the controllable switch module is electrically connected to ground;

wherein
- the controllable switch module comprises an auxiliary control port, a first controllable switch, a second controllable switch, and a current limiting resistance;
- the first controllable switch comprises a first control port, a first input port, and a first output port;
- the first control port electrically connects to the auxiliary control port of the controllable module;
- the first control port electrically connects to the control circuit;
- the first input port electrically connects to the input port of the controllable switch module;
- the first output port electrically connects to ground;
- the second controllable switch comprises a second control port, a second input port, and a second output port;
- the second control port electrically connects to the control port of the controllable switch module;
- the second control port electrically connects the said control circuit;
- the second output port electrically connects to ground;
- one port of the current limiting resistance connects to the input port of the controllable switch module; and
- another port of the current limiting resistance connects to the second input port.

2. The colored light apparatus of claim 1, wherein the signal edges are generated when the controllable switch module turns from ON to OFF, or when the controllable switch module turns from OFF to ON.

3. The colored light apparatus of claim 2, wherein a rising signal edge is generated for the plurality of LED modules when the controllable switch module is turned from OFF to ON, the common anode and the common cathode are changed from equal potential to unequal potential when the controllable switch module is turned from OFF to ON; a falling signal edge is generated for the plurality of LED modules when the controllable switch module is turned from ON to OFF, the common anode and said common cathode are changed from unequal potential to equal potential when the controllable switch module is turned from ON to OFF.

4. The colored light apparatus of claim 3, wherein a time interval is larger than 10 ns and smaller than 10 ms when the controllable switch module is turn OFF for signal edge generation.

5. The colored light apparatus of claim 4, wherein the signal edges are used as control signals for the LED driver; the LED driver is triggered by the signal edges to perform arithmetic and/or logic computation; the LED group are driven based on results from the arithmetic and/or logic computation of the LED driver.

6. The colored light apparatus of claim 5, wherein the signal edges are used as clock signals for the LED driver; the LED driver is triggered by the clock signals to the perform arithmetic and/or logic computation; the LED group are driven based on the results from the arithmetic and/or logic computation of the LED driver.

7. The colored light apparatus of claim 1, wherein a N channel MOSFET is said controllable switch module, the gate of said N channel MOSFET is the control port of said controllable switch module; the drain of said N channel MOSFET is the input port of said controllable switch module; the source of said N channel MOSFET is the output port of said controllable switch module.

8. The colored light apparatus of claim 1, wherein the signal edges are generated from:

a first step, the first controllable switch is turned OFF;

a second step, the second controllable switch is turned from ON to OFF to generate a falling signal edge;

a third step, the second controllable switch is turned from OFF to ON to generate a rising signal edge;

repeat the second step and the third step to generate a plurality of falling signal edges and a plurality of rising signal edges;

a final step, the first controllable switch is turned ON.

9. The colored light apparatus of claim 1, wherein the second controllable switch is kept ON when the first controllable switch is turned between ON and OFF to generate the signal edges.

10. The colored light apparatus of claim 9, wherein a rising signal edge is generated when said first controllable switch is turned from OFF to ON; a falling signal edge is generated when the first controllable switch is turned from ON to OFF.

11. The colored light apparatus of claim 9, wherein current is flowing from said LED modules, the current limiting resistance and the second controllable switch to ground when the first controllable switch is turned OFF.

12. A lighting system comprising:

a current source;

a signal edge generator configured to generate signal edges and output the signal edges to the power supply line; and a plurality of light-emitting diode (LED) modules, where each LED module comprises an LED group and an LED driver to drive the LED group based on the signal edges from the power supply line;

wherein:

the LED modules are electrically connected between a common anode and a common cathode; the common anode is electrically connected to the current source;

the signal edge generator comprises a controllable switch module and a control circuit;

the controllable switch module comprises a control port, an input port and an output port;

the control port of said controllable switch module is electrically connected to said control circuit, the input port of the controllable switch module is electrically connected to the common cathode, and the output port of the controllable switch module is electrically connected to the ground;

the controllable switch module comprises an auxiliary control port, a first controllable switch, a second controllable switch, and a current limiting resistance;

the first controllable switch comprises a first control port, a first input port, and a first output port;

the first control port electrically connects to the auxiliary control port of the controllable module;

the first control port electrically connects to the control circuit;

the first input port electrically connects to the input port of the controllable module;

the first output port electrically connects to ground;

the second controllable switch comprises a second control port, a second input port, and a second output port;

the second control port electrically connects to the control port of the controllable switch module;

the second control port electrically connects to the control circuit;

the second output port electrically connects to ground;

one port of the current limiting resistance connects to the input port of the controllable switch module; and another port of said current limiting resistance connects to said second input port.

13. The lighting system of claim 12, wherein the signal edges are generated when the controllable switch module turns from ON to OFF, or when the controllable switch module turns from OFF to ON.

14. The lighting system of claim 12, wherein a rising signal edge is generated for the plurality of LED modules when the controllable switch module is turned from OFF to ON, the common anode and the common cathode are changed from equal potential to unequal potential when the controllable switch module is turned from OFF to ON; a falling signal edge is generated for the plurality of LED modules when the controllable switch module is turned from ON to OFF, the common anode and the common cathode are changed from unequal potential to equal potential when the controllable switch module is turned from ON to OFF.

15. The lighting system of claim 13, wherein a time interval is larger than 10 ns and smaller than 10 ms when the controllable switch module is turn OFF for signal edge generation.

16. The lighting system of claim 15, wherein the signal edges are used as control signals for said LED driver; the LED driver is triggered by the signal edges to perform arithmetic and/or logic computation; the LED group are driven based on results from the arithmetic and/or logic computation of the LED driver.

17. The lighting system of claim 16, wherein the signal edges are used as clock signals for the LED driver; the LED driver is triggered by the clock signals to perform the arithmetic and/or logic computation; the LED group are driven based on the results from the arithmetic and/or logic computation of the LED driver.

18. The lighting system of claim 12, wherein an N channel MOSFET is the controllable switch module, a gate of the N channel MOSFET is the control port of the controllable switch module; a drain of the N channel MOSFET is the input port of the controllable switch module; the source of the N channel MOSFET is the output port of the controllable switch module.

* * * * *